United States Patent
Sun et al.

(10) Patent No.: US 11,994,993 B2
(45) Date of Patent: May 28, 2024

(54) ADAPTIVE PREFETCHER FOR SHARED SYSTEM CACHE

(71) Applicant: NXP B.V., Eindhoven (NL)

(72) Inventors: Xiao Sun, Austin, TX (US); Xiaotao Chen, Austin, TX (US); Rohit Kumar Kaul, Autin, TX (US)

(73) Assignee: NXP B.V., Eindhoven (NL)

( * ) Notice: Subject to any disclaimer, the term of this patent is extended or adjusted under 35 U.S.C. 154(b) by 67 days.

(21) Appl. No.: 17/695,589

(22) Filed: Mar. 15, 2022

(65) Prior Publication Data

US 2023/0297507 A1 Sep. 21, 2023

(51) Int. Cl.
*G06F 12/08* (2016.01)
*G06F 12/0815* (2016.01)
*G06F 12/0862* (2016.01)
*G06F 12/0891* (2016.01)

(52) U.S. Cl.
CPC ...... *G06F 12/0862* (2013.01); *G06F 12/0815* (2013.01); *G06F 12/0891* (2013.01); *G06F 2212/1021* (2013.01)

(58) Field of Classification Search
CPC ............. G06F 12/0862; G06F 12/0815; G06F 12/0891; G06F 2212/1021
See application file for complete search history.

(56) References Cited

U.S. PATENT DOCUMENTS

| | | | |
|---|---|---|---|
| 8,645,631 B2 | 2/2014 | Hooker et al. | |
| 8,719,510 B2 | 5/2014 | Hooker et al. | |
| 9,690,707 B2 | 6/2017 | Chou | |
| 10,157,136 B2 | 12/2018 | Peled et al. | |
| 10,353,819 B2 | 7/2019 | Dwiel et al. | |
| 10,705,987 B2 | 7/2020 | Avrukin et al. | |
| 2014/0075163 A1 | 3/2014 | Loewenstein et al. | |
| 2015/0143075 A1* | 5/2015 | Bradbury | G06F 9/30032 712/5 |
| 2015/0212943 A1* | 7/2015 | Yang | G06F 12/0862 711/137 |
| 2021/0365376 A1* | 11/2021 | Roberts | G06F 12/0804 |

OTHER PUBLICATIONS

Heirman Wim, "Near-side prefetch throttling adaptive prefetching for high-performance many-core processors", 2005 43rd ACM/IEEE Design Automation Conference, IEEE, Piscataway, NJ, USA, Nov. 1, 2018 (Nov. 1, 2018), pp. 1-11, XP058498316, DOI: 10.1145/3243176.3243181 ISBN: 978-1-59593-381-2.

* cited by examiner

*Primary Examiner* — Masud K Khan

(57) ABSTRACT

An adaptive prefetcher for a shared system cache of a processing system including multiple requestors having a cache miss monitor and a prefetch controller. The cache miss monitor monitors requests for information from memory and identifies one of the requestors for which an identified cache line is requested. The prefetch controller submits an adaptive request for a subsequent cache line. The subsequent cache line may be determined based on a latency comparison between a loop latency (LL) of the prefetch controller and a stream latency (SL) of the identified requestor. A latency memory may be included that stores stream latencies for the requestors. The latency comparison may be used to determine how many cache lines to skip relative to the identified cache line, such as according to SL*SK<LL≤SL*(SK+1) in which SK is the number of cache lines to skip.

16 Claims, 5 Drawing Sheets

ADAPTIVE PREFETCHER FOR SHARED SYSTEM CACHE

BACKGROUND

Field of the Invention

The present disclosure relates in general to cache system prefetchers, and more specifically to an adaptive prefetcher for a shared system cache.

Description of the Related Art

A system cache shares cache line fills from multiple requestors to retrieve requested information for performing read or write transactions. The requestors may include any combination of devices, such as, for example, central processing units (CPUs), microprocessors, microcontrollers, bus masters, etc. The information may include any combination of code, instructions, data, etc. The shared system cache, however, is a limited resource in which evictions should be managed to keep requestor hit rate sufficiently high for optimal performance. Many configurations include requestors with local caches having prefetch mechanisms with different strategies for requesting information, in which duplicate requests tend to reduce overall efficiency.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
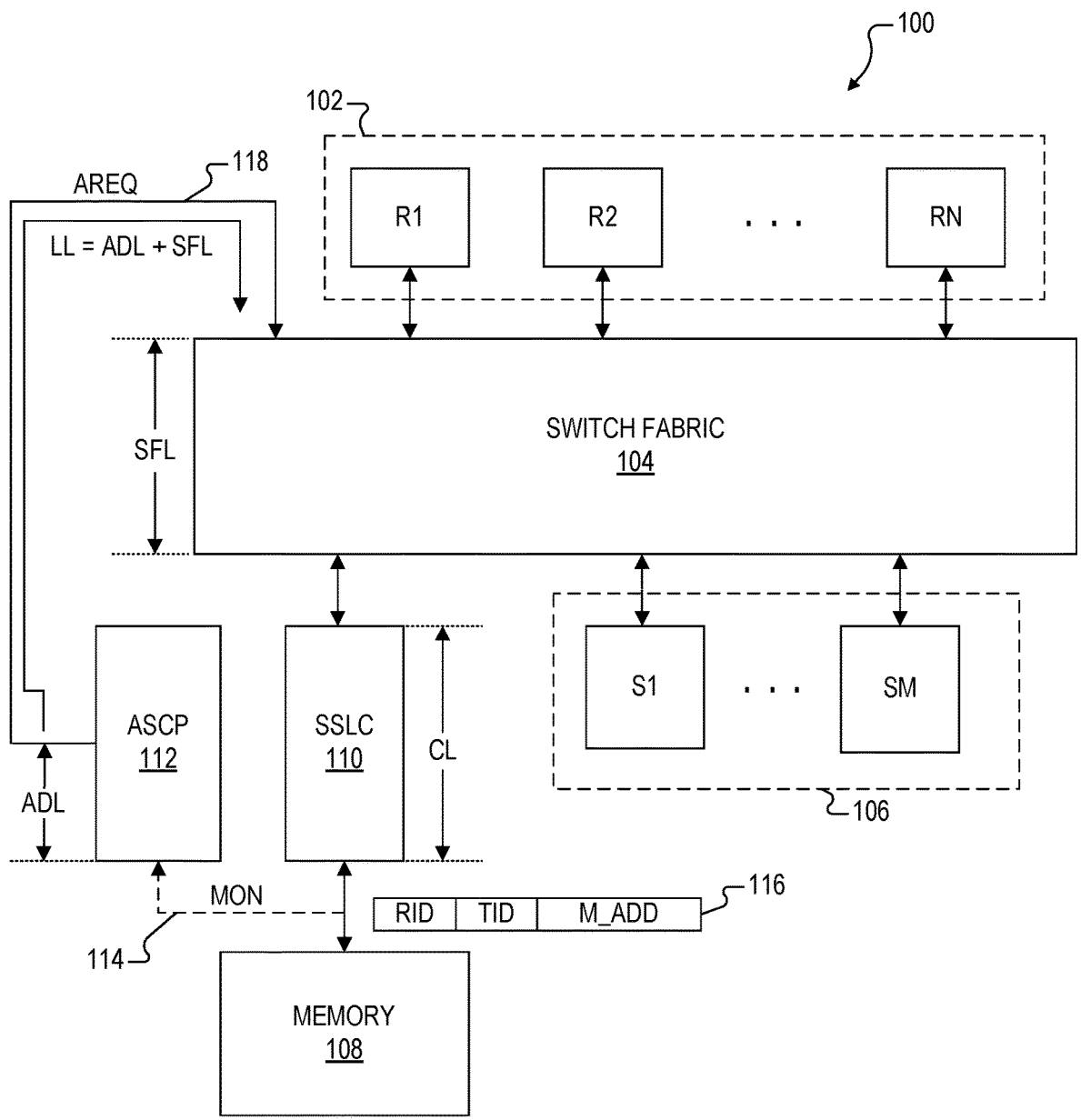
FIG. 1 is a simplified block diagram of a processing system including an adaptive shared cache prefetcher (ASCP) implemented according to one embodiment of the present disclosure.

An adaptive prefetcher for a shared system cache as described herein prefetches a selected subsequent cache line based on a latency comparison between a loop latency of the adaptive prefetcher and a stream latency of an identified requestor. The loop latency of a prefetch controller of the adaptive prefetcher includes a decision delay of the prefetch controller plus a latency of switch fabric coupled between multiple requestors and the shared system cache. Each requestor has a stream latency which is a delay between successive operations of that requestor. In one embodiment, the adaptive prefetcher includes a prefetch controller that submits an adaptive request to request the next cache line after skipping SK cache lines for a requestor when the loop latency is greater than SK multiplied by the stream latency and less than or equal to SK+1 multiplied by the stream latency of the requestor, in which SK is an integer of at least zero. The adaptive prefetcher may include a latency memory that stores a stream latency for each of the requestors. The loop and stream latencies may be fixed or may be programmable. The adaptive prefetcher may include, for example, a requestor monitor that updates the stream latencies based on actual measured stream latencies.

A processing system as described herein includes a switch fabric, a system memory, a shared system cache coupled to the switch fabric and to the memory, multiple requestors coupled to the switch fabric, each configured to submit requests to the shared system cache via the switch fabric for information stored in the system memory, and an adaptive prefetcher. The adaptive prefetcher may include a cache miss monitor and a prefetch controller. The cache miss monitor monitors requests for information by the system cache to the system memory and identifies a requestor for which an identified cache line is requested. The prefetch controller submits an adaptive request to the shared system cache via the switch fabric to request a subsequent cache line for the identified requestor, in which the subsequent cache line is determined based on a latency comparison between a loop latency of the prefetch controller and a stream latency of the identified requestor.

A method of prefetching cache lines into a shared system cache of a processing system including a plurality of requestors may include monitoring memory requests for information to be stored the shared system cache, identifying a requestor for which an identified cache line is requested, comparing a loop latency of a prefetcher with a stream latency of the identified requestor, determining a subsequent cache line relative to the identified cache line to request based on the latency comparison, and submitting an adaptive request for the subsequent cache line to the shared system cache. The method may include skipping a number of cache lines after the identified cache line based on the latency comparison. More specifically, the method may include skipping SK cache lines after the identified cache line when the loop latency is greater than SK multiplied by the stream latency and less than or equal to SK+1 multiplied by the stream latency associated with the identified requestor, in which SK is an integer of at least zero. The method may include storing a stream latency for each requestor. The method may include monitoring actual stream latencies of the requestors and updating the stored stream latencies.

FIG. 1 is a simplified block diagram of a processing system 100 including an adaptive shared cache prefetcher (ASCP) 112 implemented according to one embodiment of the present disclosure. The processing system 100 includes multiple requestors 102, a switch fabric 104, one or more slave devices 106, a memory 108, a shared system level cache (SSLC) 110, and the ASCP 112. Various other supporting devices and circuitry may be included but are not shown as not necessary for a complete understanding of the present disclosure. Any number of requestors 102 may be included, such as "N" requestors individually shown as R1, R2, ... RN (R1-RN), and may include one or more of any type of processing device, such as a bus master, a central processing unit (CPU), a microprocessor, a microcontroller, etc. Each of the requestors 102 is configured for requesting and processing information, such as code, instructions, data, etc., according to a corresponding read or write transaction.

Each of the requestors 102 is coupled to the switch fabric 104 via a bidirectional interface for reading or writing information.

The switch fabric 104 is configured for distributing information requests from the requestors 102 to any one or more of the slaves 106 or to the memory 108 via the SSLC 110, such as according to a memory-mapped scheme or the like. The switch fabric 104 may include, for example, a bus system or an array or matrix of switches and the like (not shown). Any number of slave devices 106 may be included, such as "M" slaves 106 individually shown as S1, . . . , SM (S1-SM) and are not further described in detail. The SSLC 110 is coupled to the switch fabric 104 via a bidirectional interface and may be configured with relatively fast memory devices, such as registers or the like. The memory 108 is shown coupled to the SSLC 110 via a bidirectional interface for reading or writing information. The memory 108 may be configured as any combination of random-access memory (RAM) and read-only memory (ROM) devices for storing information from, or providing information to, the requestors 102.

In one embodiment, the processing system 100 is configured as a System-on-Chip (SoC) in which each of the blocks and corresponding circuitry are implemented on a single semiconductor device or integrated circuit (IC). Alternative configurations are contemplated, such as discrete configurations in which one or more of the blocks are implemented or integrated separately.

In operation of the processing system 100, the requestors 102 submit requests for information to the slaves 106 or the memory 108, in which requests to the memory 108 are first submitted to the SSLC 110. In the event of a hit in which the requested information is found stored in the SSLC 110, the requested information may be provided by the SSLC 110 directly to the applicable requestor 102 via the switch fabric 104. It is noted that each request incorporates a requestor identifier used by the switch fabric 104 to identify the applicable requestor 102. In the event of a miss in which the requested information is not stored in the SSLC 110, the SSLC 110 forwards the request to the memory 108. The memory 108 incorporates addressing circuitry and the like (not shown) which uses addressing information contained within each request for accessing requested information. The memory 108 responds to each request by accessing and providing one or more cache lines incorporating the requested information for temporary storage in the SSLC 110, which ultimately forwards the requested information to the applicable requestor 102 via the switch fabric 104 using the corresponding requestor identifier.

It is appreciated that the SSLC 110 is a limited resource having a size targeted to optimize performance without excessive cost. Also, once the SSLC 110 becomes full of information retrieved from the memory 108 during operation, additional requests cause previously stored information to be evicted according to an applicable eviction policy. Such requests and corresponding evictions should be managed for a given cache size while optimizing the hit rate of requests from the requestors 102.

One or more of the requestors 102 may submit a stream of requests from time to time in which each stream includes multiple requests to sequential cache lines in the memory 108. For example, a stream may be submitted for requesting sequential instructions stored in the memory 108, or sequential lines or blocks of data and the like. Although not specifically shown, one or more of the requestors 102 may include a local cache with a local prefetcher for requesting a stream of requests for sequentially stored information. The ASCP 112 monitors forwarded memory requests from the SSLC 110 to the memory 108 via a monitor (MON) interface 114 (shown as a dashed line). As shown, for example, a memory request 116 forwarded from the SSLC 110 to the memory 108 includes a memory address (M_ADDR) identifying a cache line location within the memory 108 storing the requested information to be stored in the SSLC 110. The memory request 116 may further include a requestor identifier (RID) identifying one of the requestors 102 that requested the information. In addition, depending upon the particular implementation, the information packet 116 and may also a thread identifier (TID) for identifying the thread being executed on the requestor that requested the information.

As described further herein, the ASCP 112 is configured to anticipate future requests of one or more of the requestors 102 and to submit corresponding adaptive requests via an adaptive request (AREQ) interface 118 provided to another input of the switch fabric 104. The adaptive requests are made by the ASCP 112 to minimize duplication of, and reduce the total number of, requests submitted by one or more of the requesters 102. Each adaptive request submitted by the ASCP 112 via the AREQ interface 118 is treated in a similar manner as the requests by the requestors 102. In particular, each adaptive request is forwarded by the switch fabric 104 to the SSLC 110, which in turn forwards the adaptive requests to the memory 108 for retrieving and storing requested information into the SSLC 110. The ASCP 112 may retrieve the RID (and the TID, if applicable) from the memory request 116 detected via the monitor interface 114 and submit at least one corresponding adaptive request on behalf of the identified entity (e.g., requestor and thread).

The processing system 100 incorporates several latencies or delays in which each latency is a measure of elapsed time or delay between successive operations or for a function to complete. Each of the requestors R1-RN has a stream latency (SL) which is a measure of elapsed time between successive read (RD) or write (WR) transactions. In other words, SL measures delay between successive requests for information to the switch fabric 104. It is noted that the SL may be different for each of the requestors 102. The stream latencies of the requestors R1-RN are defined as stream latency values SL1, SL2, . . . , SLN (SL1-SLN), respectively. Although the SL may be different for different requestors from one implementation to the next, for a given implementation, the SL is generally the same for a given requestor 102 over time. In other words, the stream latency values SL1-SLN may be predetermined and pre-stored for a given configuration. One or more of the requestors 102 may execute multiple threads, each associated with a corresponding one of multiple applications or software programs or the like. Each thread of a given requestor 102 is assumed to have the same stream latency unless separately identified.

The switch fabric 104 has a switch fabric latency (SFL), which is a delay between a request from a requestor 102 or from the ASCP 112 and when the request is submitted to the SSLC 110. The SSLC 110 has a cache latency (CL) which is a measure of the delay from when a request for information is submitted to the SSLC 110 to when a miss is determined causing a corresponding request to the memory 108. The delay of a hit depends upon where the information is located within the SSLC 110 and is usually less than CL. The ASCP 112 has an adaptive decision latency (ADL) from when it detects a miss transaction via the monitor interface 114 to when it makes a decision and corresponding adaptive request via the AREQ interface 118. A loop latency (LL) value is defined for the ASCP 112 as LL=ADL+SFL which is a delay from a detected miss to when a corresponding adaptive request is provided to the SSC 110 from the switch matrix 104.

When a miss occurs in the SSLC 110, a significant latency occurs for retrieving a cache line from the memory 108 for storage into the SSLC 110 and for ultimately providing the information to the applicable requestor 102. Miss latency can be substantially greater than hit latency, such as on the order of 10 times greater or more. Thus, it is desired to optimize operation of the SSLC 110 using the ASCP 112 to reduce the number of misses as much as possible.

The actual time delay associated with each of the latencies depend upon the specific implementation and configuration. In one embodiment, for example, the processing system 100 operates at about 400 megahertz (MHz) in which each of the latencies are determined based on a number of cycles of a system clock operating at 400 MHz or the like. In a specific 400 MHz embodiment, the SFL and CL latencies are each 4 cycles or 10 nanoseconds (ns), ADL is about 3 cycles or 7.5 ns so that LL is about 7 cycles or 17.5 ns. Such specific latency values are exemplary only in which actual latencies may vary for different clock frequencies and circuitry configurations.

Figure 2:
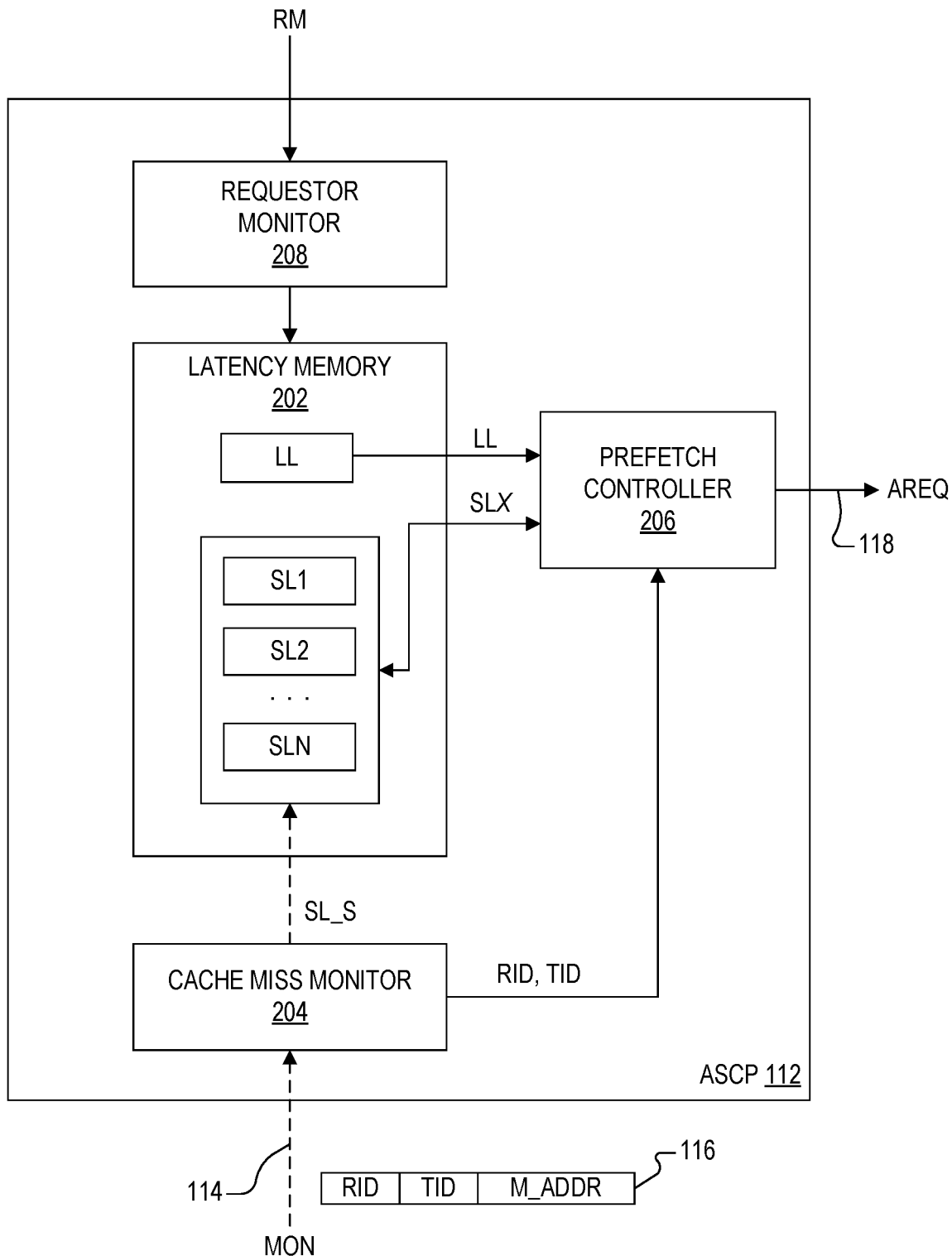
FIG. 2 is a more detailed block diagram of the ASCP of FIG. 1 according to one embodiment of the present disclosure.

FIG. 2 is a more detailed block diagram of the ASCP 112 according to one embodiment of the present disclosure. The ASCP 112 includes, or otherwise has access to, a latency memory 202 that stores the stream latency values SL1-SLN for the requestors R1-RN, respectively. The latency memory 202 may also store the LL value defining the loop latency of the ASCP 112. The ASCP 112 may further include a cache miss monitor 204, a prefetch controller 206, and a requestor monitor 208. In one embodiment, the loop latency value LL and the stream latency values SL1-SLN are predetermined and fixed in which the latency memory 202 may be implemented using a ROM device or the like. The ROM device may be programmable, such as implemented as an electrically erasable programmable ROM (EEPROM) or the like. In an alternative embodiment, the latency memory 202 may be implemented as RAM device. The SL1-SLN and LL values may still be predetermined and fixed, in which the values may be loaded into the latency memory 202 upon power up or reset (POR) or the like. Alternatively, one or more of the loop latency value LL and stream latency values SL1-SLN may be programmable and may even be adjusted over time. In one embodiment, for example, the requestor monitor 208 that monitors activity and timing of one or more of the Requestors 102 and updates the corresponding stream latency values SL1-SLN accordingly.

The cache miss monitor 204 monitors requests from the SSLC 110 to the memory 108 via a monitor interface 114 in response to misses of the SSLC 110, such as, for example, the memory request 116. In one embodiment, the cache miss monitor 204 forwards the RID (and if applicable, the TID) of the memory request 116 to the prefetch controller 206. The prefetch controller 206 retrieves the LL value and uses the RID value to retrieve a corresponding stream latency value SLX from the latency memory 202, in which SLX is a selected one of the stream latency values SL1-SLN. For example, RID may be used as or converted to a lookup value for retrieving the corresponding SLX. It is noted that the LL value may alternatively be stored or otherwise hardwired within the prefetch controller 206. In addition, or in the alternative, the cache miss monitor may use RID to assert a stream latency select (SL_S) value (e.g., a lookup value or the like) to the latency memory 202 for selecting the corresponding SLX. The prefetch controller 206 uses the retrieved information to construct and submit a corresponding adaptive request to the switch controller 104 via the AREQ interface 118. As further described herein, the adaptive requests are selected as anticipatory requests to optimize performance of the system cache SSLC 110. In various embodiments, the prefetch controller 206 compares LL with SLX of the applicable requestor 102 to determine which information from the memory 108 to subsequently request for the requestor 102 identified by RID.

Figure 3:
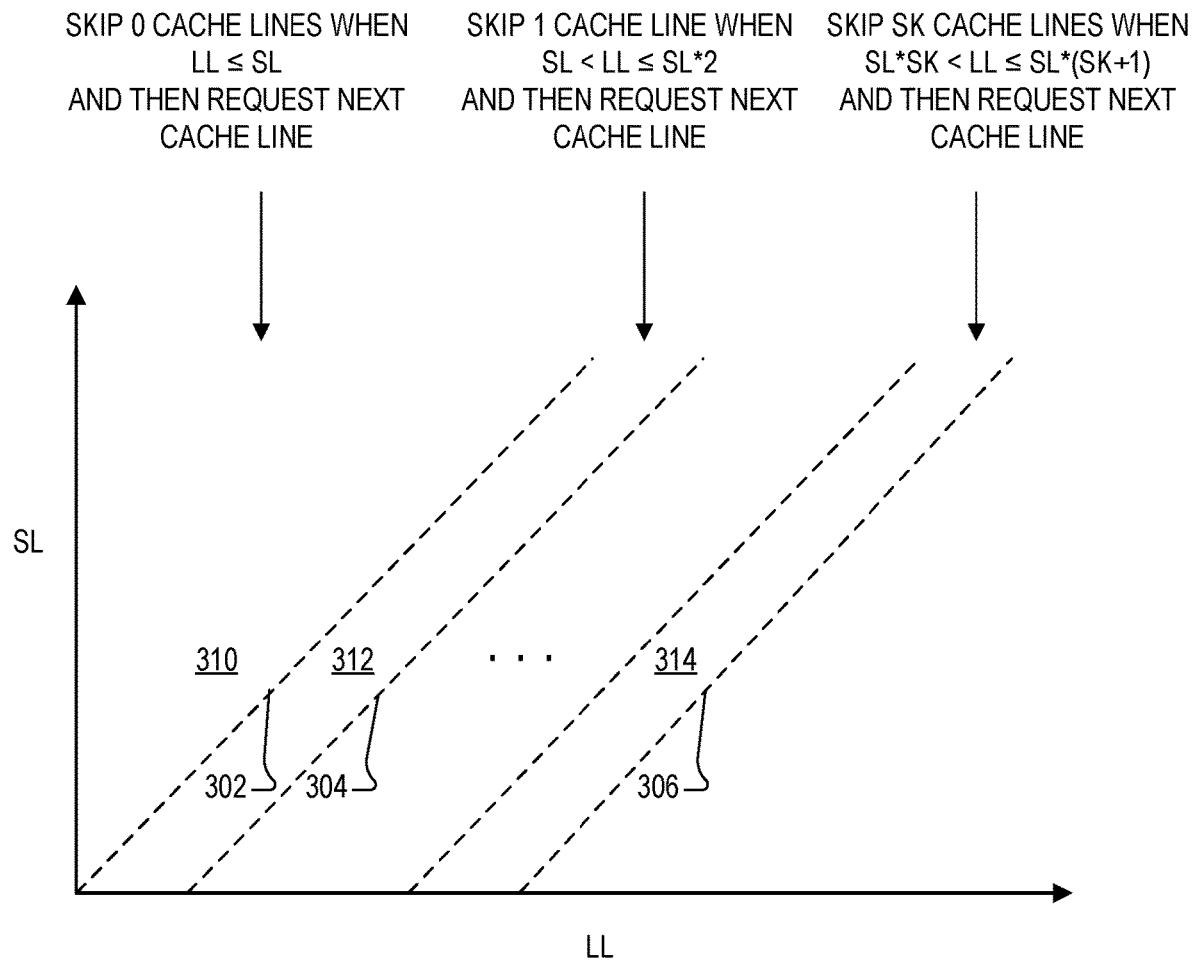
FIG. 3 is a simplified graphic diagram plotting stream latency versus loop latency illustrating operation of the prefetch controller of FIG. 2 according to one embodiment of the present disclosure.

FIG. 3 is a simplified graphic diagram plotting stream latency (SL) versus loop latency LL illustrating operation of the prefetch controller 206 according to one embodiment of the present disclosure. SL and LL may be measured in units of time or in units of cycles of a clock or frequency of operation. The prefetch controller 206 compares SL and LL for construction an adaptive request for requesting a subsequent cache line for an applicable one of the requestors 102. The comparison between SL and LL determines how many cache lines to skip for selecting the cache line to request in the adaptive request. The LL value is the loop latency of the ASCP 112, and the SL value generally represents a selected one of the latency SL1-SLN values for a corresponding one of the requestors R1-RN, respectively, where it is understood that each of the requestors 102 may have a different SL value. Again, the LL value or the SL1-SLN values may be fixed for a given configuration or may be programmable.

A first plotted line 302 represents the case in which LL=SL, a second plotted line 304 represents the case in which LL=SL*2 (in which an asterisk denotes multiplication), and so on up to a last line 306 representing the case in which LL=SL*(SK+1), where SK is an integer factor value of 0 or greater. According to the graphic diagram, when LL≤SL such that operation is in a first area 310 (SK=0), then the prefetch controller 206 of the ASCP 112 does not skip any cache lines (e.g., skips SK=0 cache lines) and requests the next cache line. When SL<LL≤SL*2 such that operation is in area 312 (SK=1), then the prefetch controller 206 skips SK=1 cache line and then requests the next cache line. Although not specifically shown, this pattern repeats for each successive line defining a corresponding area between sequential lines. Thus, for example, when SL*2<LL≤SL*3, then the prefetch controller 206 skips 2 cache lines, or when SL*3<LL≤SL*4, then the prefetch controller 206 skips 3 cache lines, and so on. The last plotted line 306 represents the general case in which the prefetch controller 206 skips SK cache lines when SL*SK<LL≤SL*(SK+1) as shown by area 314. For example, the first line 302 and area 310 are applicable when SK=0 in which case the prefetch controller 206 skips SK=0 cache lines when 0<LL≤SL, the second line 304 and area 312 are applicable when SK=1 in which case the prefetch controller 206 skips SK=1 cache line when SL<LL≤SL*2, and so on.

Figure 4:
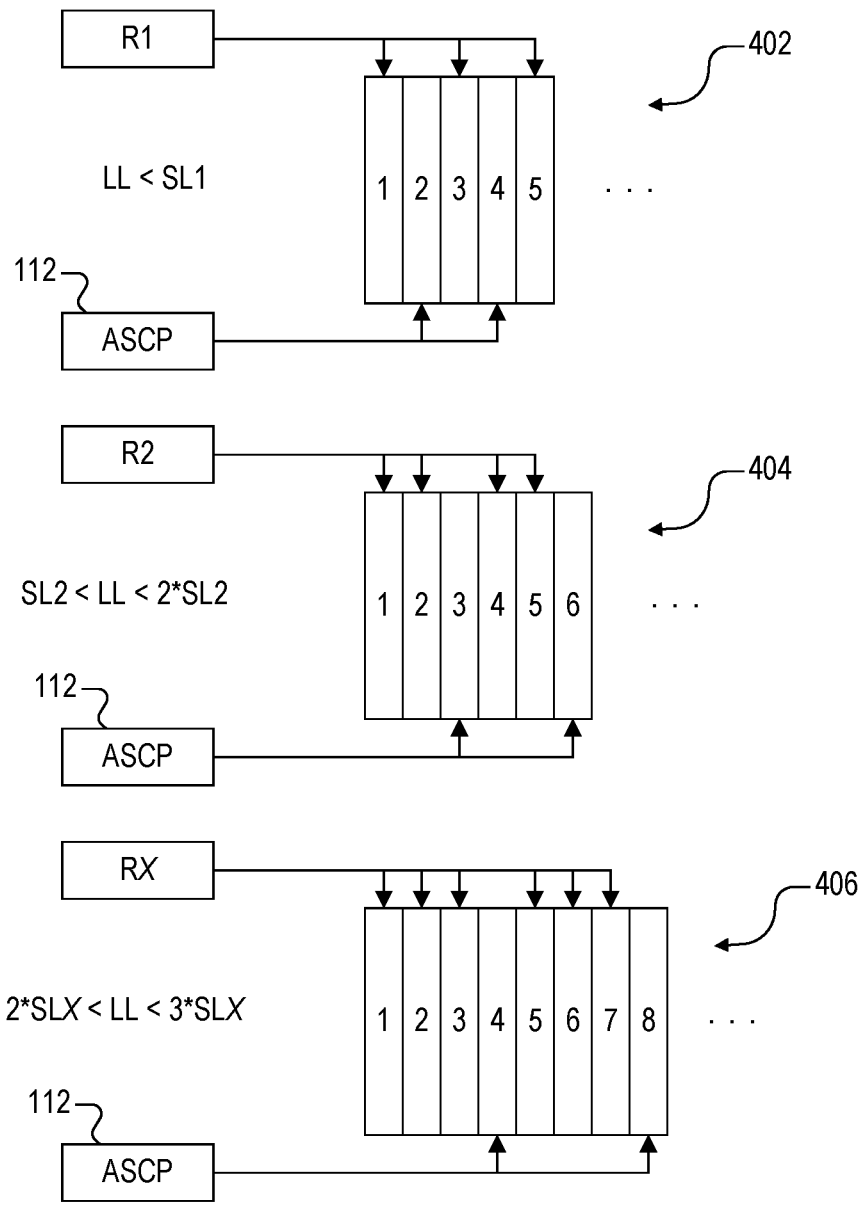
FIG. 4 is a diagram illustrating operation of the ASCP of FIG. 1 having loop latency LL for requesting cache lines for various ones of the requestors with different stream latencies according to one embodiment of the present disclosure.

FIG. 4 is a diagram illustrating operation of the ASCP 112 having loop latency LL for requesting cache lines for various ones of the requestors 102 with different stream latencies according to one embodiment of the present disclosure. In each of three illustrated scenarios 402, 404, and 406, cache lines are being requested by an applicable one of the requestors 102, in which the ASCP 112 is submitting adaptive cache line requests for that same requestor.

In the first scenario 402, LL is less than the stream latency SL1 of the requestor R1. After R1 requests a first cache line 1, the ASCP 112 does not skip any cache lines but requests the next cache line 2. Operation may continue in similar manner, in which R1 requests line 3 followed by ASCP 112 requesting the next cache line 4, and so on. Assuming that R1 continues to request sequential cache lines, the ASCP 112 avoids duplicate requests and enables R1 to skip every other cache line thereby improving overall efficiency.

In the second scenario 404, LL is greater than the stream latency SL2 of the requestor R2 but is less than 2*SL2. In this case, after R2 requests the first cache line 1, the ASCP 112 skips cache line 2 and requests cache line 3. Operation may continue in similar manner, such that before the ASCP 112 requests cache line 3, R2 has requested cache line 2, so that the cache lines are requested in order. Assuming that R2 continues to request sequential cache lines, the ASCP 112 avoids duplicate requests and enables R2 to skip every third cache line thereby improving overall efficiency.

In the second scenario 406, LL is greater than twice the stream latency SLX of an arbitrary numbered requestor RX but is less than 3*SLX. In this case, after RX requests the first cache line 1, the ASCP 112 skips 2 cache lines 2 and 3 and requests cache line 4. Operation may continue in similar manner, such that before the ASCP 112 requests cache line 4, RX has requested cache lines 2 and 3, so that the cache lines are requested in order. Assuming that RX continues to request sequential cache lines, the ASCP 112 avoids duplicate requests and enables RX to skip every fourth cache line thereby improving overall efficiency.

Figure 5:
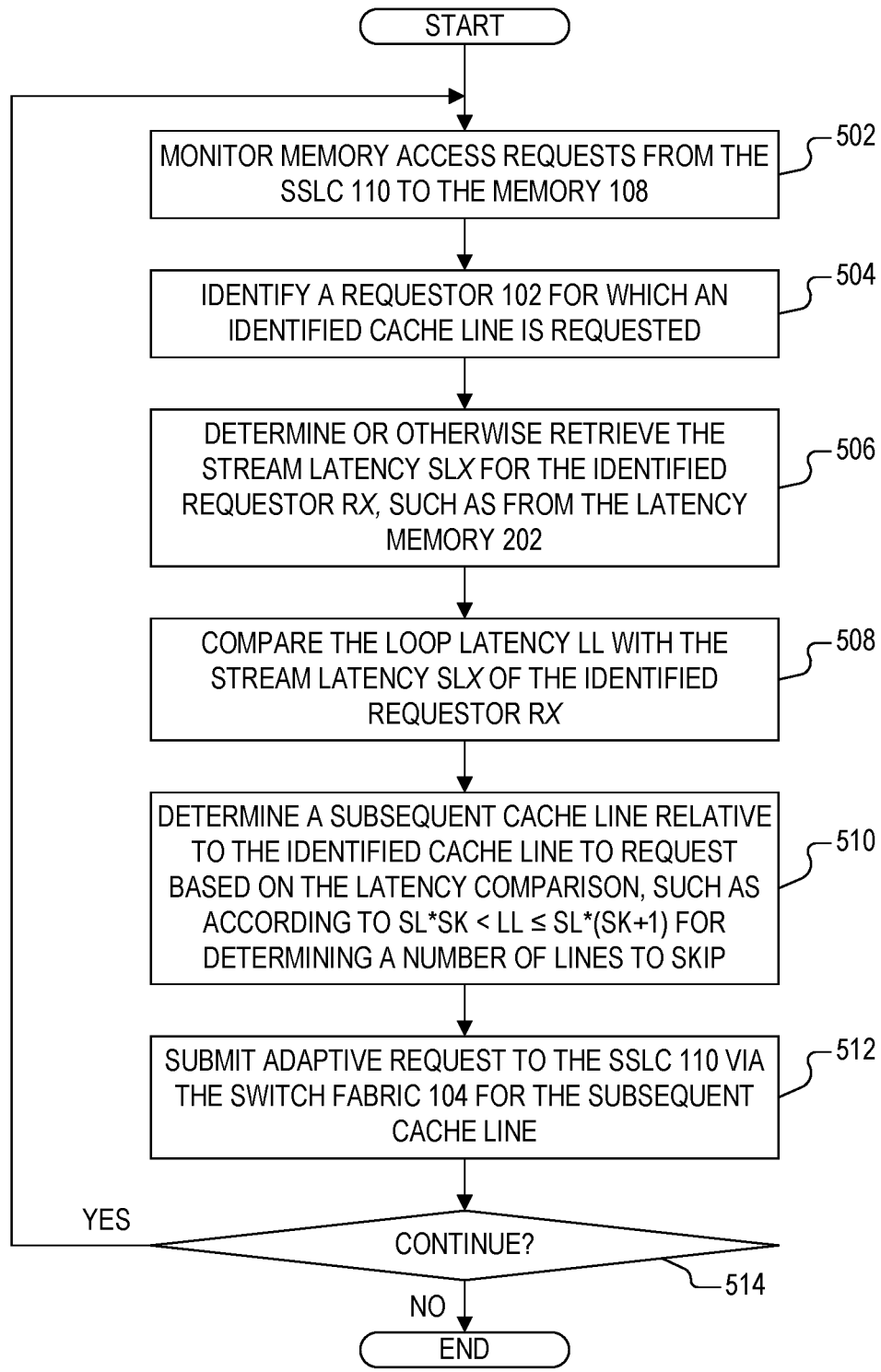
FIG. 5 is a simplified flowchart diagram illustrating operation of the ASCP of FIG. 2 according to an embodiment of the present disclosure.

FIG. 5 is a simplified flowchart diagram illustrating operation of the ASCP 112 according to an embodiment of the present disclosure. At first block 502, the cache miss monitor 204 monitors memory access requests from the SSLC 110 to the memory 108, such as, for example, the memory request 116. At next block 504, the cache miss monitor 204 or the like identifies one of the requestors 102 for which an identified cache line is requested. The memory request 116, for example, includes a requestor identifier RID identifying one of the requestors R1-RN, and also includes a memory address M_ADD or the like for identifying the requested cache line. At next block 506, either the cache miss monitor 204 or the prefetch controller 206 determines or otherwise retrieves the stream latency SLX for the identified requestor RX, such as from the latency memory 202. At next block 508, the prefetch controller 206 compares the loop latency LL with the stream latency SLX of the identified requestor RX. At next block 510, the prefetch controller 206 determines a subsequent cache line relative to the identified cache line to request based on the latency comparison, such as according to SL*SK<LL≤SL*(SK+1) for determining a number of lines to skip from the identified cache line. At next block 512, the prefetch controller 206 submits an adaptive request to the SSLC 110 via the switch fabric 104 for the subsequent cache line.

At next block 514, it is queried whether to continue monitoring and adaptive requesting. If so, operation loops back to block 502 for continued monitoring. Operation may continue for subsequent lines of the same requestor 102 or for another requestor depending upon memory requests submitted by the SSLC 110. If operation is not to be continued, operation is completed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. An adaptive prefetcher for a shared system cache of a processing system including a plurality of requestors, comprising:
   a cache miss monitor that is configured to monitor requests for information to be stored in the shared system cache and to identify one of the plurality of requestors for which an identified cache line is requested;
   a prefetch controller that is configured to submit an adaptive request to request a subsequent cache line to be stored the shared system cache for the identified requestor, wherein the subsequent cache line is determined based on a latency comparison between a loop latency of the prefetch controller and a stream latency of the identified requestor;
   a latency memory that stores a plurality of stream latencies including a corresponding stream latency for each of the plurality of requestors; and
   a requestor monitor that is configured to monitor actual stream latencies of the plurality of requestors and to update the plurality of stream latencies.

2. The adaptive prefetcher of claim 1, further comprising a latency memory that stores a plurality of stream latencies including a corresponding stream latency for each of the plurality of requestors.

3. The adaptive prefetcher of claim 1, wherein the prefetch controller is configured to use the latency comparison to determine how many cache lines to skip relative to the identified cache line to determine the subsequent cache line.

4. The adaptive prefetcher of claim 1, wherein the prefetch controller is configured to submit the adaptive request to request the next cache line after the identified cache line when the loop latency is less than the stream latency associated with the identified requestor.

5. The adaptive prefetcher of claim 1, wherein the prefetch controller is configured to submit the adaptive request to request the next cache line after skipping at least SK cache lines for the identified requestor when the loop latency is greater than SK multiplied by the stream latency associated with the identified requestor, and wherein SK is an integer of at least zero.

6. The adaptive prefetcher of claim 1, wherein the prefetch controller is configured to submit the adaptive request to request the next cache line after skipping SK cache lines for the identified requestor when the loop latency is greater than SK multiplied by the stream latency and less than or equal to SK+1 multiplied by the stream latency associated with the identified requestor, and wherein SK is an integer of at least zero.

7. An adaptive prefetcher for a shared system cache of a processing system including a plurality of requestors, comprising:
a cache miss monitor that is configured to monitor requests for information to be stored in the shared system cache and to identify one of the plurality of requestors for which an identified cache line is requested;
a prefetch controller that is configured to submit an adaptive request to request a subsequent cache line to be stored the shared system cache for the identified requestor, wherein the subsequent cache line is determined based on a latency comparison between a loop latency of the prefetch controller and a stream latency of the identified requestor;
a lookup memory that stores a plurality of stream latencies including a corresponding stream latency for each of the plurality of requestors; and
wherein one of the cache miss monitor and the prefetch controller uses a requestor identifier provided in a request submitted on behalf of the identified requestor.

8. A processing system, comprising:
a switch fabric;
a system memory;
a shared system cache coupled to the switch fabric and to the memory;
a plurality of requestors coupled to the switch fabric, each configured to submit requests to the shared system cache via the switch fabric for information stored in the system memory;
an adaptive prefetcher, comprising:
a cache miss monitor that is configured to monitor requests for information by the system cache to the system memory and to identify one of the plurality of requestors for which an identified cache line is requested;
a prefetch controller that is configured to submit an adaptive request to the shared system cache via the switch fabric to request a subsequent cache line for the identified requestor, wherein the subsequent cache line is determined based on a latency comparison between a loop latency of the prefetch controller and a stream latency of the identified requestor; and
a latency memory that stores a plurality of stream latencies including a corresponding stream latency for each of the plurality of requestors, and wherein the prefetch controller retrieves a corresponding one of the plurality of stream latencies associated with the identified requestor from the latency memory.

9. The processing system of claim 8, wherein the loop latency of the prefetch controller comprises a decision delay of the prefetch controller plus a latency of the switch fabric, and wherein the stream latency comprises a delay between successive operations of the identified requestor.

10. The processing system of claim 8, wherein the adaptive prefetcher further comprises requestor monitor that is configured monitor actual stream latencies of the plurality of requestors and to update the plurality of stream latencies stored in the latency memory.

11. The processing system of claim 8, wherein the prefetch controller is configured to use the latency comparison to determine how many cache lines to skip relative to the identified cache line to determine the subsequent cache line.

12. The processing system of claim 8, wherein the prefetch controller is configured to submit the adaptive request to request the next cache line after skipping SK cache lines for the identified requestor when the loop latency is greater than SK multiplied by the stream latency and less than or equal to SK+1 multiplied by the stream latency associated with the identified requestor, and wherein SK is an integer of at least zero.

13. A method of prefetching cache lines into a shared system cache of a processing system including a plurality of requestors, comprising:
monitoring memory requests for information to be stored in the shared system cache;
identifying one of the plurality of requestors for which an identified cache line is requested;
comparing a loop latency of a prefetcher with a stream latency of the identified requestor;
determining a subsequent cache line relative to the identified cache line to request based on the latency comparison;
submitting an adaptive request for the subsequent cache line to the shared system cache;
storing a plurality of stream latencies including a corresponding stream latency for each of the plurality of requestors; and
monitoring actual stream latencies of the plurality of requestors and updating the plurality of stream latencies.

14. The method of claim 13, wherein the determining a subsequent cache line comprises skipping a number of cache lines after the identified cache line based on the latency comparison.

15. The method of claim 13, wherein the determining a subsequent cache line comprises skipping SK cache lines after the identified cache line when the loop latency is greater than SK multiplied by the stream latency and less than or equal to SK+1 multiplied by the stream latency associated with the identified requestor, and wherein SK is an integer of at least zero.

16. A method of prefetching cache lines into a shared system cache of a processing system including a plurality of requestors, comprising:
monitoring memory requests for information to be stored in the shared system cache;
identifying one of the plurality of requestors for which an identified cache line is requested;
comparing a loop latency of a prefetcher with a stream latency of the identified requestor;
determining a subsequent cache line relative to the identified cache line to request based on the latency comparison;
submitting an adaptive request for the subsequent cache line to the shared system cache;
storing a plurality of stream latencies including a corresponding stream latency for each of the plurality of requestors; and
retrieving a requestor identifier from a request submitted by the shared system cache for information stored in the memory, and using the requestor identifier to retrieve a corresponding one of the plurality of stored stream latencies.

\* \* \* \* \*